United States Patent Office 3,475,224
Patented Oct. 28, 1969

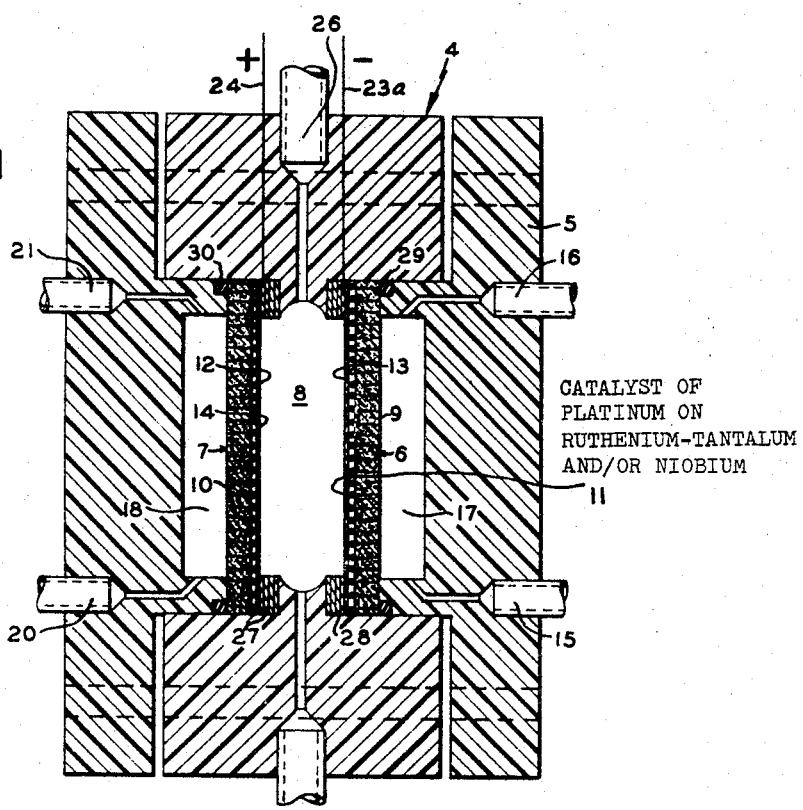

3,475,224
FUEL CELL HAVING CATALYTIC FUEL
ELECTRODE
Otto J. Adlhart, Newark, N.J., and Antal J. Hartner, New York, N.Y., assignors to Engelhard Industries, Inc., Newark, N.J., a corporation of Delaware
Filed Jan. 3, 1967, Ser. No. 607,055
Int. Cl. H01m 27/10
U.S. Cl. 136—120                    6 Claims

ABSTRACT OF THE DISCLOSURE

Fuel cell anode catalysts consist essentially of platinum deposited on an alloy in the form of a powder of ruthenium and tantalum or niobium.

---

The invention relates to new and improved fuel electrodes and to the production of electrical energy utilizing fuel cells having such fuel electrodes.

Fuel cells are well known as devices for the direct conversion of a fuel to electrical energy. The cells basically are composed of an oxidizer electrode (cathode), a fuel electrode (anode) and an electrolyte. Fuels which have been used heretofore as reactant in fuel cells include reformer gas, normally gaseous hydrocarbons, and oxygenated hydrocarbons, e.g., methanol.

However, the use of these fuels at the anode with acid or neutral electrolytes and with certain catalysts at the anode such as platinum alone or ternary alloys containing platinum such as platinum-tantalum-ruthenium, has resulted in a strong anodic polarization under load, i.e. during current withdrawal. The result has been a reduction in the overall power output of fuel cells using the prior art catalytic anodes.

The applicants have found that use of anode catalyst having platinum deposited on an alloy of ruthenium and tantalum, niobium, or both, provides a particularly beneficial result. Polarization loss is decreased substantially over that previously obtainable by the catalyst known in the art. The catalytic electrodes of the present invention permit a significant and substantial reduction in energy lost by polarization. The ruthenium alloy provides a stable corrosion-resistant carrier for the platinum and provides catalytic activity as well during fuel cell operation.

In accordance with the present invention, it has now been found that the strong anodic polarization occurring during current withdrawal with prior art fuel cells operating with fuels comprising carbon containing compounds is materially reduced or minimized according to this invention utilizing the new and improved fuel electrode. The present fuel electrode comprises as catalyst a ruthenium alloy having platinum deposited thereon. Such electrode is characterized by providing a materially higher level of catalytic activity than prior art electrodes. Although we do not wish to be bound by the theory behind the unexpected improvement obtained, it may well be that the ruthenium alloy acts partially as a catalyst and in part as a carrier for the platinum in such way as to prevent carrier instability. The alloy may provide an inert catalyst subsurface and thereby permit improved results with use of platinum. This inert carrier characteristic is possibly supplied by an electrically conductive surface oxide film.

Throughout the specification and claims, the term "alloy" is used in the broad sense accepted by the art, e.g. the "Encyclopaedic Dictionary of Physics," Pergamon Press, 1961, as a macroscopically homogeneous mixture of metals. It will be appreciated therefore that the alloys of ruthenium which are employed herein include intimate mixtures of the metals which may either be immiscible, or in the form of mixed crystals or solid solutions or actual chemical compounds. Furthermore, the constituents of such intimate mixtures, either as initially prepared or during operation of the fuel cells, may be partially in the oxidized form.

The physical arrangement of the catalyst of this invention, i.e. the platinum deposited on the ruthenium alloy, is important herein for the reason that such arrangement results in a materially higher level of catalytic activity being maintained at the anode for a longer time than when platinum or a ternary alloy having the same chemical composition as the catalyst of this invention is used at the anode. Consequently, the relatively strong anodic polarization occurring with the use of the anode catalysts of the art is materially reduced. Further, it is essential the ruthenium and tantalum or niobium and the ternary ruthenium-tantalum-niobium be alloyed together instead of being merely mechanically mixed. The non-alloyed mixture of the metals would result in relatively poor catalytic activity at the fuel electrode.

The catalyst of these fuel electrodes can be either unsupported or supported on a suitable substrate. When unsupported, it can be in the form of a self-sustaining disc or sheet formed by compacting a mass of the alloy particles in a die by application of pressure. When supported, the catalyst can be applied and adhered to the surface of metallic structures such as sheets, grids or other porous structures or non-metallic structures such as, for instance, structures of graphite, plastics, carbon such as activated carbon powder, and the like. The catalyst on activated carbon powder is then adhered to a structural substrate. In the case of a cell employing a quasi-solid electrolyte, such as an ion exchange membrane, the catalyst may be imbedded in the surface of such electrolyte.

The cathode, i.e. oxidizer electrode, can be a catalytic or non-catalytic electrode. When a catalytic cathode is utilized, a platinum group metal, for instance platinum per se, palladium per se, or ruthenium per se can be deposited in finely divided form on the supporting substrate.

The process for production of electrical energy in accordance with this invention comprises, in its broader aspects, contacting a catalytic fuel electrode of a fuel cell with a fuel, the fuel electrode comprising as catalyst platinum deposited on an alloy of ruthenium and tantalum, an alloy of ruthenium and niobium, or an alloy of ruthenium, tantalum and niobium, and being in contact with an electrolyte, and contacting an oxidizer electrode of the cell with an oxidizer, the oxidizer electrode also being in contact with the electrolyte.

The fuel can be contacted in gaseous or vapor phase with the electrolyte by passage within a gas pervious fuel electrode comprising the catalyst described above on the porous supporting substrate. Alternatively the fuel can be dissolved in the electrolyte, for example methanol dissolved in sulfuric acid electrolyte, wherein it contacts the catalytic fuel electrode. The oxidizer, for instance an oxygen-containing gas, can be contacted with the electrolyte by passage within a gas-pervious oxidizer electrode. Consequently, the fuel reacts electro-chemically at the fuel electrode with release of electrons which are carried off by electrically conductive means and an external circuit, and the oxidizer reacts electrochemically at the oxidizer electrode with electrons supplied from the external circuit, so that a continuous electric current results.

According to this invention, the fuel electrode catalyst comprises platium deposited on a ruthenium alloy. The relative weight of platium to the alloy may vary considerably and the final catalyst composition may normally contain about 3–75 weight percent of platinum, preferably about 10–50 weight percent.

The uncoated alloy contains essentially ruthenium and the remainder tantalum, niobium, or both tantalum and niobium. The amount of ruthenium present may vary between about 5–60% by weight, and is preferably present in amounts of about 5–40%. Typical alloys useful in accordance with the present invention include essentially 5% Ru, 95% Ta; 20% Ru, 80% Ta; 10% Ru, 90% Nb; 10% Ru, 80% Nb, 10% Ta; and the like.

The ruthenium-tantalum, ruthenium-niobium or ruthenium-tantalum-niobium alloys useful according to this invention may be prepared by a variety of different methods. One method of preparation comprises melting the metals in proportions corresponding to that desired in the alloy together with an additional component, the latter being capable of being readily leached out of the resulting alloy, for instance aluminum. The melting of the mixture can be done in a gas-fired or electrical furnace. The resulting alloy, after removal from the furnace and cooling solidification, is treated with acid, for instance by immersion in a mineral acid such as hydrochloric acid, or sulfuric acid and the like of, for instance, about 10% concentration, to leach or dissolve out the aluminum. The resultant alloy is obtained as a powder. The aluminum is usually present in major amount, with the remaining alloy metals present in minor amount. Thus a typical alloy prior to the leaching contains, by weight, 85% aluminum and 15% total ruthenium and tantalum.

To make the catalyst useful in the electrode, fuel cell, and process of this invention, the alloy described above may be coated with platinum by a number of methods. Soluble platinum compounds such as $H_2PtCl_6$, $Na_2PtCl_6$, $K_2PtCl_4$, etc. may be contacted in concentrated aqueous solution with a stirred suspension of the alloy powder, and the wet powder evaporated to dryness leaving the platinum salt adhering to the alloy. The composition is then reduced to platinum on alloy powder by heating with a flowing stream of hydrogen or annealing gas. Alternatively, the stirred slurry may be subjected to a wet reduction of the platinum on the alloy powder by hydrazine, formaldehyde, a formate, or hydroxylamine.

In one embodiment for preparing electrodes with supported catalysts, the catalyst particles are conveniently applied and adhered in powder form to the support. When porous "Teflon" is the supporting substrate, the catalyst powder is pressed into the surface of the "Teflon" at normal temperature by means of a suitable press, for instance a hydraulic press, to permit adherence to such support. When an ion exchange membrane fabricated of, for instance polystyrene sulfonic acid, is the support, the powdered catalyst is pressed into the membrane surface to adhere to such support with the membrane surfaces maintained at an elevated temperature, suitably about 100° C.

The fuel may be a normally gaseous, liquid or solid carbon-containing fuel such as a hydrocarbon and includes $C_1$–$C_{20}$ acyclic and cyclic aliphatic hydrocarbons including paraffinic, olefinic, and acetylenic hydrocarbons, naphthenes, and aromatic hydrocarbons. Exemplary of such fuels are methane, natural gas, ethane, propane, butane, pentane, hexane, a naphtha light ends $C_5$–$C_7$ fraction, a gasoline fraction, a kerosene fraction, liquefied petroleum gas, cyclobutane, cyclopropane, cyclopentane, cyclohexane, ethylene, propylene, acetylenes and benzene. Other carbon-containing fuels that may be utilized are oxygenated hydrocarbons, for instance alcohols, e.g. methanol, aldehydes, e.g. formaldehyde, organic acids, e.g. formic acid, and carbon monoxide. Hydrogen may also be used as a fuel as well as a mixture of hydrogen and carbon monoxide as in reformer gas, and hydrogen and methanol, methane or ethylene. Large organic molecules may also be very favorable carbon-containing fuels in accordance with this invention, provided the fuel can be supplied adequately to the anode catalyst surface. Exemplary of such large organic molecules are long chain hydrocarbons, fatty acids, fatty acid esters, and sugars.

The electrolyte utilized is preferably an acid electrolyte, for instance aqueous sulfuric acid solution, e.g. aqueous sulfuric acid solution of 5% to 80% by weight concentration, or aqueous phosphoric acid of similar concentration. Other electrolytes that are satisfactory are neutral or substantially neutral electrolytes containing no free base or substantially devoid of free base, for instance sulfates, phosphates and perchlorates of alkali metals and alkaline earth metals.

The method of this invention may be performed at ambient conditions but preferably are operated at elevated temperatures in the range of about 50° C.–300° C. Sufficient heat for operation of the cells is usually provided by some polarization unavoidably occurring therein. Heat may be supplied from an outside source for start-up and, if necessary, during the course of the cell operation, for instance by steam supplied to a suitable steam jacket. The temperature of the cell may be controlled, for instance, by means of the amount of insulation material utilized, or by circulation of cooling air or other cooling gas about the cell.

Reference is now made to the accompanying drawings wherein:

FIGURE 1 is a longitudinal section through a fuel cell useful according to this invention; and FIGURE 2 is an enlarged section through a fuel electrode useful according to this invention.

Referring to FIGURE 1, fuel cell 4 comprises container 5 of "Teflon" or other material of low electrical conductivity, electrodes 6 and 7 of opposing polarity therein and respectively the fuel electrode and oxidizer electrode and liquid electrolyte 8, preferably an acid electrolyte, contacting opposed surfaces of electrodes 6 and 7. Electrodes 6 and 7 are each made up of a porous substrate or support 9 and 10 respectively, for instance a sheet of porous "Teflon" sponge. Fuel electrode 6 is gas pervious and has permeable catalyst layer 11 of the platinum on ruthenium alloy catalyst adhered to the support, and gas pervious oxidizer electrode 7 also has a permeable catalyst layer 12 of platinum alone adhered to the support. In addition to the catalyst being adhered to the exterior surface of supports 9 and 10 of electrodes 6 and 7, some of the catalyst is on the walls defining accessible pores of the porous supports or substrates 9 and 10. A three phase boundary of catalyst, electrolyte and gaseous fuel results in the pores of substrate 9 of fuel electrode 6, where the catalyst surface contacts the menisci of the electrolyte and the gaseous fuel. Single play platinum gauze sheets 13 and 14 contact catalyst layer 11 and 12 respectively for collection and withdrawal of electric current. The connection to the conventional reference electrode (not shown) is designated at 26. Annular members 27 and 28 of gold and O-rings 29 and 30 of neoprene rubber serve to respectively maintain the gauze sheets 14 and 13 in contact with the catalyst layers and to seal the assembly.

Fuel inlet and outlet 15 and 16 respectively enable supply of the fuel in gaseous form into anode compartment 17 and the outflow of gaseous reaction products from such compartment.

The oxidizer is introduced into cathode compartment 18 through inlet 20 and the cathode effluent evolves through outlet 21. Exemplary of the oxidizer is air, oxygen-enriched air, or oxygen per se, preferably air.

One fuel electrode useful according to this invention is shown in more detail in FIGURE 2. Pores 22 of porous supporting substrate 9 communicate opposite sides of support 9. The novel catalyst is supported on substrate 9 as a gas- and liquid-permeable layer 11 of powder particles 23 with some of the catalyst particles on the walls defining the accessible pores of porous substrate 9, as previously disclosed herein. A current collecting and withdrawal member such as the platinum gauze sheet 13 shown in FIGURE 1 will contact catalyst layer 11 for the purpose stated.

Electrically conductive elements 23a and 24 are connected to the upper portion of the platinum gauze current collectors 13 and 14 respectively. Conductive elements 23a and 24 are connected in an external circuit with a suitable resistance, for instance an incandescent lamp (not shown), and the flow of current in such circuit due to the flow of electrons resulting from the electro-chemical reaction within the fuel cell, results in the lamp being energized and lighting up.

A variety of electrode catalyst combinations has been evaluated with fuel cells or by a half cell evaluation procedure. The latter is especially convenient for rapid and unambiguous determination of differences in anode polarization, as any limitations due to cathode polarization or resistance polarization are eliminated. Such a half cell evluation procedure is described in J. Electrochem Soc. 109, 553 (1962). The half cell method used to evaluate the novel catalysts was similar except that a hydrogen reference electrode was used instead of the calomel electrode.

The invention is further illustrated by reference to the following example.

Finely divided alloy particles of 90 weight percent of tantalum and 10 weight percent of ruthenium are prepared by melting a mixture consisting of 85 parts by wt. Al, 1.5 parts by wt. Ru and 13.5 parts by wt. Ta in an electric arc furnace. After cooling, the melt is immersed in a 10% aqueous solution of HCl to leach the Al. The resultant 10 Ru–90 Ta alloy is recovered as a powder and then sieved using a 400 mesh sieve. The alloy powder is then coated with platinum. The resultant catalyst particles are composed of 25% Pt; 67.5% Ta, and 7.5% Ru, by weight. A finely divided ternary alloy containing 23.2% Pt, 70% Ta, and 6.8% Ru is prepared, it having about the same proportion of each ingredient as the catalyst having the platinum coating. The metal particles are then deposited and pressed onto a porous Teflon sheet of approximately 10 mil thickness and a porosity of 50%. The above electrodes and a platinum black electrode are then tested using a hydrogen reference electrode and conventional half cell techniques. The anode potential is measured at various current densities at a fuel cell operating temperature of 90° C. Gaseous fuels as defined below in Table I and 30% sulfuric acid electrolyte are used. The results of the tests are set out in Table II.

TABLE I

| Gas Composition: | Fuel A | Fuel B |
|---|---|---|
| $H_2$ | 72.5 | 67 |
| CO | 2.0 | 13 |
| $CO_2$ | 21.3 | 15 |
| $CH_4$ | 4.2 | 5 |

The above data clearly show the superiority of fuel cell anode catalyst comprising platinum on tantalum-ruthenium alloy over either platinum alone or a ternary alloy of platinum, ruthenium and tantalum. Even when an operating temperature as low as 90° C. and a fuel containing 13% CO are used, the polarization is relatively low.

When an alloy of ruthenium 40%-tantalum 60%, ruthenium 10%-niobium 80%-tantalum 10% or ruthenium 10%-niobium 90% is used in place of the ruthenium-tantalum alloy described above, results similar to those tabulated above for Pt on Ru-Ta are obtained.

It will be obvious to those skilled in the art that many modifications may be made within the scope of the present invention without departing from the spirit thereof, and the invention includes all such modifications.

What is claimed is:

1. A fuel cell comprising a catalytic fuel electrode, an oxidizer electrode, an electrolyte contacting a surface of each electrode, means for supplying an oxidizer to the oxidizer electrode and means for supplying fuel to the fuel electrode, wherein the catalyst of the fuel electrode consists essentially of about 10–50 weight percent platinum and an alloy of about 5–40% ruthenium and the remainder tantalum or niobium, said platinum being deposited on the alloy which alloy is in the form of powder consisting essentially of said ruthenium and said remainder.

2. A fuel cell according to claim 1 wherein the electrolyte is an acid electrolyte.

3. A fuel cell according to claim 2 wherein the alloy consists essentially of about 5–40 weight percent ruthenium and the remainder tantalum.

4. A process for the production of electrical energy by use of a fuel cell having an oxidizer electrode and a catalytic fuel electrode, which comprises contacting the oxidizer electrode with an oxidizer and an electrolyte, and contacting the catalytic fuel electrode with fuel and said electrolyte, said catalytic fuel electrode catalyst consisting essentially of about 10–50 weight percent platinum and an alloy of about 5–40 weight percent ruthenium and the remainder tantalum or niobium, said platinum being deposited on the alloy which alloy is in the form of powder consisting essentially of said ruthenium and said remainder.

5. A process according to claim 4 wherein the alloy consists essentially of 5–40 weight percent ruthenium and the remainder tantalum.

6. A process according to claim 5 wherein the electrolyte is an acid electrolyte.

TABLE II

| Catalyst Composition (weight percent) | Physical Arrangement | Fuel | Catalyst Loading, mg. of Pt/sq. cm. | Potential in Volts, ma./cm.² | | | | | |
|---|---|---|---|---|---|---|---|---|---|
| | | | | 0 | 20 | 40 | 67 | 100 | 200 |
| 25% Pt, 67.5% Ta, 7.5% Ru | Pt on Ta-Ru Alloy | A | 2.5 | .002 | .025 | .052 | .098 | .173 | .344 |
| 23.2% Pt, 70% Ta, 6.8% Ru | Pt-Ta-Ru Ternary Alloy | A | 2.9 | .002 | .248 | .365 | .430 | .473 | .590 |
| 100% Pt | Pt Black | A | 2.5 | .002 | .024 | .090 | .277 | .320 | .482 |
| 25% Pt, 67.5% Ta, 7.5% Ru | Pt on Ta-Ru Alloy | B | 2.5 | .007 | .030 | .077 | .211 | .319 | .426 |
| 23.2% Pt, 70% Ta, 6.8% Ru | Pt-Ta-Ru Ternary Alloy | B | 2.9 | .004 | .403 | .493 | .551 | | |
| 100% Pt | Pt Black | B | 2.5 | .006 | .285 | .367 | .411 | .446 | .510 |

References Cited

UNITED STATES PATENTS

| 2,719,797 | 10/1955 | Rosenblatt et al. | 29—198 |
| 2,922,092 | 1/1960 | Gazzara et al. | 29—194 |
| 3,254,015 | 5/1966 | Steele | 204—290 |
| 3,109,734 | 11/1963 | Bishop et al. | 75—174 |
| 3,274,031 | 9/1966 | Maget et al. | 136—86 |
| 3,309,231 | 3/1967 | Hess | 136—120 |

WINSTON A. DOUGLAS, Primary Examiner

C. F. LE FEVOUR, Assistant Examiner

U.S. Cl. X.R.